(12) United States Patent
Bright

(10) Patent No.: US 8,217,537 B2
(45) Date of Patent: Jul. 10, 2012

(54) MAGNETO-PLASMA-DYNAMIC GENERATOR AND METHOD OF OPERATING THE GENERATOR

(75) Inventor: Christopher G Bright, Nottingham (GB)

(73) Assignee: Rolls-Royce, PLC, London (GB)

( * ) Notice: Subject to any disclaimer, the term of this patent is extended or adjusted under 35 U.S.C. 154(b) by 285 days.

(21) Appl. No.: 12/718,763

(22) Filed: Mar. 5, 2010

(65) Prior Publication Data

US 2010/0237716 A1    Sep. 23, 2010

(30) Foreign Application Priority Data

Mar. 23, 2009   (GB) .................................. 0904850.5

(51) Int. Cl.
  *G21D 7/02*        (2006.01)
  *H02K 44/00*       (2006.01)
(52) U.S. Cl. ............................. 310/11; 310/219; 219/71
(58) Field of Classification Search .................... 310/11, 310/219; 219/71; 313/328
  See application file for complete search history.

(56) References Cited

U.S. PATENT DOCUMENTS

| 2,716,943 | A | * | 9/1955 | Vandenberg | 417/50 |
|---|---|---|---|---|---|
| 3,160,768 | A | * | 12/1964 | Goeschel et al. | 310/11 |
| 3,219,852 | A | * | 11/1965 | Brill | 310/11 |
| 3,243,713 | A | | 3/1966 | Brahm | |
| 3,271,603 | A | * | 9/1966 | Wiedemann | 310/219 |
| 3,275,860 | A | * | 9/1966 | Way | 310/11 |
| 3,355,604 | A | * | 11/1967 | Klein et al. | 310/11 |
| 3,397,331 | A | * | 8/1968 | Burkhard | 310/11 |
| 3,414,745 | A | * | 12/1968 | Bidard | 310/11 |
| 3,443,129 | A | * | 5/1969 | Hammitt | 310/11 |
| 3,453,461 | A | * | 7/1969 | Engel | 310/11 |
| 3,453,462 | A | * | 7/1969 | Dunning, Jr. et al. | 310/11 |
| 3,582,976 | A | * | 6/1971 | de Simone et al. | 310/11 |
| 3,614,489 | A | * | 10/1971 | Jensen et al. | 310/11 |
| 3,736,447 | A | | 5/1973 | Zauderer | |
| 3,746,896 | A | * | 7/1973 | Gruner | 310/11 |
| 3,854,061 | A | * | 12/1974 | Rosa | 310/11 |
| 3,940,641 | A | * | 2/1976 | Dooley | 310/11 |
| 3,999,089 | A | * | 12/1976 | Barros | 310/11 |
| 4,800,727 | A | * | 1/1989 | Petrick | 60/649 |
| 4,906,877 | A | * | 3/1990 | Ciaio | 310/11 |

(Continued)

FOREIGN PATENT DOCUMENTS

JP          01126153 A  *  5/1989

(Continued)

OTHER PUBLICATIONS

Translation of foreign document SU 782693.*

(Continued)

*Primary Examiner* — Quyen Leung
*Assistant Examiner* — Alex W Mok
(74) *Attorney, Agent, or Firm* — Oliff & Berridge, PLC

(57) ABSTRACT

A magnetoplasmadynamic (MPD) generator has a conveying duct shaped for conveying a high velocity, conductive fluid; a magnetic field generator arranged to generate a magnetic field across the conveying duct, substantially perpendicular to the direction of travel of the fluid, such that the fluid passes through the magnetic field when conveyed by the duct; electrodes arranged to conduct a current induced in the fluid as it is conveyed by the conveying duct through the magnetic field; and a fluid break-down circuit arranged to electrically breakdown the fluid by developing an additional voltage across the electrodes.

15 Claims, 17 Drawing Sheets

U.S. PATENT DOCUMENTS

| | | | | |
|---|---|---|---|---|
| 5,473,205 A | * | 12/1995 | Haaland | 310/11 |
| 5,637,934 A | * | 6/1997 | Fabris | 310/11 |
| 5,685,966 A | * | 11/1997 | Aaron et al. | 204/600 |
| 6,029,453 A | * | 2/2000 | Mendive | 60/641.2 |
| 6,846,467 B1 | * | 1/2005 | Predtechensky | 422/186.21 |
| 6,982,501 B1 | * | 1/2006 | Kotha et al. | 310/11 |
| 2007/0274840 A1 | * | 11/2007 | Ehben et al. | 417/50 |

FOREIGN PATENT DOCUMENTS

| | | |
|---|---|---|
| RU | 2 111 601 C1 | 5/1998 |
| SU | 782693 A1 | 10/1991 |
| SU | 782694 A1 | 10/1991 |

OTHER PUBLICATIONS

Translation of foreign document SU 782694.*

Jul. 28, 2009 Search Report issued in corresponding British Patent Application No. GB0904850.5.

Rietjens, "The Future for MHD Power Generation", Phys. Technol., 1979, pp. 216-221, vol. 10, The Institute of Physics, Great Britian.

P. C. Stangeby, "A Review of the Status of MHD Power Generation Technology Including Suggestions for a Canadian MHD Research Program," Institute for Aerospace Studies, Nov. 1974, UTIAS Review No. 39, University of Toronto.

* cited by examiner

MAGNETO-PLASMA-DYNAMIC GENERATOR AND METHOD OF OPERATING THE GENERATOR

The present invention relates to magneto-plasma-dynamic (MPD) generators and to operating such MPD generators.

MPD generators are in general known. They are sometimes referred to as magneto-hydro-dynamics (MHD) generators, despite the fact that they can be applied to the flow of gases and plasma in addition to the flow of liquids. The more correct term MPD will be used hereafter.

Three general types of MPD generators are known. These are the Faraday MPD generator, the Hall effect MPD generator and the disc MPD generator. A schematic of a Faraday MPD generator is shown in FIG. 1. In use, a high velocity ionised gas 1 is conveyed in a duct through a magnetic field 2 perpendicular to the velocity. A voltage 3 is developed perpendicular to the magnetic field 2 and velocity according to Fleming's right hand rule. Current 5 is collected by positive and negative MPD electrodes 4 labelled + and − respectively. The current can be applied to an electrical load.

The Hall effect MPD generator and the disc MPD generator apply the same principle as the Faraday MPD generator, but have somewhat different structures.

After generation of MPD power, the exhaust gas is hot enough and fast enough to be used in other processes, typically to raise steam for conventional turbogenerators. MPD generation is therefore regarded as a "topping cycle" which increases the thermal efficiency of electric power generation by using the temperature difference between the temperature of combustion and the temperature that most engineering materials can withstand. In other words, MPD generators can be used to extract useful energy from exhaust gas, for example in an electricity generating plant. MPD/MHD is a widely known principle, but has met with limited commercial success. For example, the UK Central Electricity Generating Board did extensive work on MPD but with no commercial success. Reference material on MPD power generation includes:

[1]. The future for MHD power generation L. H. T. Rietjens 1979 *Physics in Technology* 10 216-21.
[2]. Stangeby (1974): A review of the status of MHD power generation technology including suggestions for a Canadian MHD research programme, Institute for Aerospace Studies, University of Toronto, UTIAS Review No. 39.

In addition, the use of an MHD generator for generating radio frequency energy is disclosed in U.S. Pat. No. 3,243,713.

The known MPD generators have been able to extract only a limited amount of electrical power through the MPD electrodes. Attempts have been made to increase the efficiency by improving the ionisation of the gas between the MPD electrodes, by either irradiating the gas using ionising radiation or seeding the gas stream with readily ionisable chemicals. These attempts have not been commercially successful.

It remains desirable to provide an MPD generator having an improved efficiency.

According to a first aspect of the invention, there is provided an MPD generator. Advantageously, the MPD generator is able to cause the electrical break-down of the fluid between the MPD electrodes, thus improving the ionisation—and hence, electrical conductivity—of the fluid. Fluid as used in this context includes a plasma.

Preferably, the fluid break-down circuit includes a first inductor and a voltage source connected to the first inductor for generating the additional voltage across the first inductor; wherein the electrodes of the MPD generator are provided in parallel to the first inductor and are used as a short-circuit to short-circuit the first inductor when the additional voltage causes the electrical breakdown of the fluid between the electrodes. By operating the MPD generator as a short-circuit in this way, a large current is caused to flow. This greatly increases the ionisation of the fluid and its electrical conductivity.

In one embodiment, the fluid break-down circuit includes a resonant circuit. In this way, a high voltage can be realised for causing the short-circuit across the MPD electrodes. In this regard, the resonant circuit may comprise; a capacitor, wherein the capacitor and the first inductor are the resonant circuit and wherein the resonant circuit is configured to be in electrical resonance with the voltage supplied by the voltage source and wherein the capacitor and the first inductor are arranged in series.

The voltage source may be an AC voltage supply in part.

Preferably in the above embodiment, the fluid break-down circuit may further comprise: a second inductor; and a second inductor bypass switch configurable in a first position in which the second inductor is bypassed and in a second position in which the second inductor is not bypassed, wherein the second inductor bypass switch is configured to assume the first configuration until electrical breakdown of the fluid and the second configuration after electrical breakdown of the fluid, whereby the second inductor is then able to resonate with the capacitor, the first inductor and the fluid between the electrodes. In this way, it is possible to restore resonance after the electrical breakdown of the fluid between the MPD electrodes. Restoration of the resonance allows the AC voltage source to circulate a large AC current through the fluid between the MPD electrodes. This AC current interacts with the negative dynamic resistance of the fluid to generate AC power. As a further advantage, restoring resonance greatly improves the purity of the waveform of the AC generated, markedly reducing troublesome harmonics.

Further, the fluid break-down circuit may include a second capacitor, a third inductor and a third inductor bypass switch, the second capacitor is arranged in series with the first inductor and the capacitor such that it is balanced with respect to earth.

Still further, the MPD generator may comprise a switch provided in parallel to the first inductor and the electrodes, the switch being switchable between a closed configuration and an open configuration so as to cause a voltage inductive spike across the electrodes to thereby electrically break-down the fluid. Thus, generation of a voltage inductive spike may be used as a simple way to initiate the MPD generator.

In addition, a generator transformer may be coupled to the AC voltage supply input to perform current-voltage transformation. In this way, the fluid break-down circuit can be efficiently coupled to an AC voltage source coming from a standard electrical transmission system.

Still further, the MPD generator may include a plurality of heterodyning AC frequency supplies. These can be used advantageously to modulate the frequency output, so as to provide output power from the MPD generator at a desired frequency.

In another embodiment of the MPD generator, the voltage source is a starting voltage source and the fluid break-down circuit further comprises a starting switch arranged to connect and disconnect the starting voltage source to and from the electrodes or to bypass or not bypass the electrodes.

The starting voltage source may be a high voltage source, in which case the starting switch is configured to connect the starting voltage source to the MPD electrodes to apply a high voltage thereto until the fluid is electrically broken down. The starting switch is further configured, once a satisfactory MPD current has been established between the electrodes, to disconnect the starting voltage source.

Alternatively, the starting voltage source may be a lower voltage source used to circulate current through the first inductor. The starting switch is configurable in a first configuration to connect the starting voltage source to the first inductor or to bypass the electrodes so as to enable current to flow through the first inductor, and in a second configuration to interrupt the current and to cause a high voltage to appear across the switch and the MPD electrodes. The starting voltage source may be provided in series with the first inductor.

In addition, the fluid break-down circuit may further comprise a starting transformer for connecting the starting voltage source to the electrodes.

In another embodiment, the MPD generator may further comprise a conversion device for converting the electrical power output by the electrodes into a different frequency, voltage or number of electrical phases for delivering the electrical power to an electrical load or an electrical AC supply. The conversion device may be an inverter or motor-generator set. Further, the conversion device may be operable to perform bi-directional power conversion so that electrical power may be taken readily from an electrical AC supply.

According to a second aspect of the invention, there is provided a method of operating a magneto-plasma-dynamic generator according to the first aspect, the method comprising: using the fluid break-down circuit to develop an additional voltage across the electrodes of the MPD generator which is sufficient to electrically break-down the fluid between the electrodes by using the electrodes as a short circuit.

In a preferred embodiment, the method further comprises circulating a large AC current through the fluid between the electrodes, after the fluid has been electrically broken down, to generate AC power using the interaction of the AC current with the negative dynamic resistance of the fluid.

The source of the fluid for the MPD generator of the first aspect may be, for example, a gas-cooled nuclear reactor, a solar-power device, an external heat device heating up a gas through a heat exchanger, or a pulsed power source such as exploding munitions propellant. In addition, source of the fluid may be burning pulverised coal or residual fuel oil.

Accordingly, the invention may further provide an electricity generating system comprising: a gas-cooled nuclear reactor; and an MPD generator according to the first aspect, wherein the fluid for the MPD generator is the gas coolant of the nuclear reactor.

Accordingly, the invention may further provide an electricity generating system comprising: a solar-powered gas heating device; and an MPD generator according to the first aspect, wherein the fluid for the MPD generator is the gas heated by the solar-powered gas heating device.

Still further, the invention may provide a vehicle incorporating the MPD generator according to the first aspect.

Reference is now made, by way of example only, to the accompanying drawings, in which.

Figure 1:
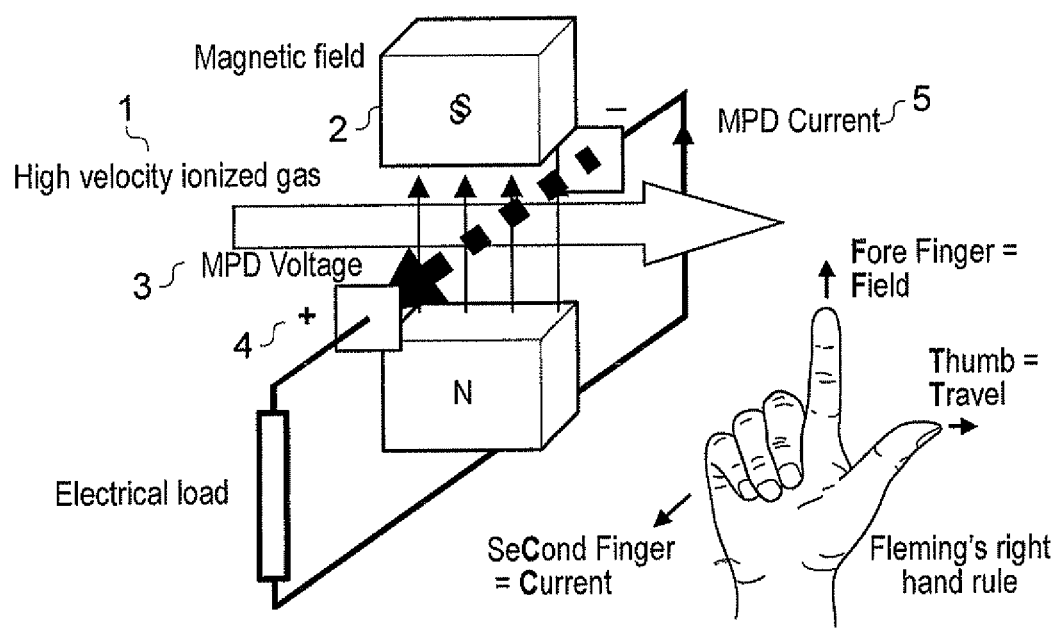
FIG. 1 shows a schematic of a Faraday MPD generator.
Figure 2:
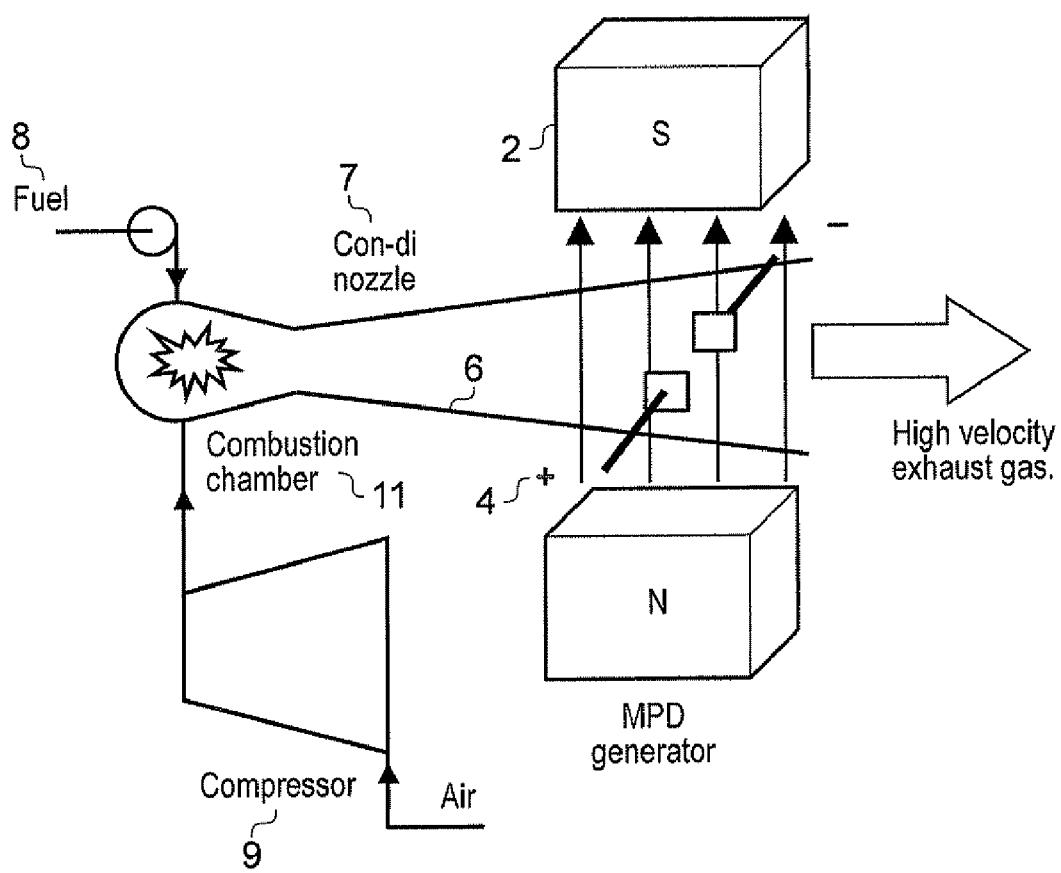
FIG. 2 shows an MPD generator according to an embodiment of the invention.

FIG. 2 shows an MPD generator according to an embodiment of the invention. The generator includes a duct 6 for conveying a hot gas from a combustion chamber 11 and con-di nozzle 7 through a magnetic field 2, generated by a magnet illustrated by poles S and N, so as to generate an MPD current between MPD electrodes 4. Fuel 8 is burned above ambient pressure in the combustion chamber 11 by igniting it in the presence of compressed air from a compressor 9. The combustion products are expanded using the convergent-divergent nozzle 7 (or other known technique) to produce a high velocity stream of gas with a static pressure well below atmospheric pressure. By using such a reduced pressure it is possible to take advantage of the resulting lower electrical break-down voltage of the gas, as described by Paschen's Law. The high velocity gas 1 is passed between the MPD electrodes 4 in the magnetic field 2 as shown in FIG. 1. This produces an induced MPD voltage between the electrodes 4. This voltage is not normally sufficient to electrically break down the gas between the electrodes or generate useful amounts of current or power.

The exhaust gas exiting the conveying duct 6 after passing through the magnetic field 2 may be travelling at supersonic speeds. This may be useful for some applications, such as rocket propulsion, in which case such an MPD generator can be used to produce auxiliary power for the vehicle.

Figure 3:
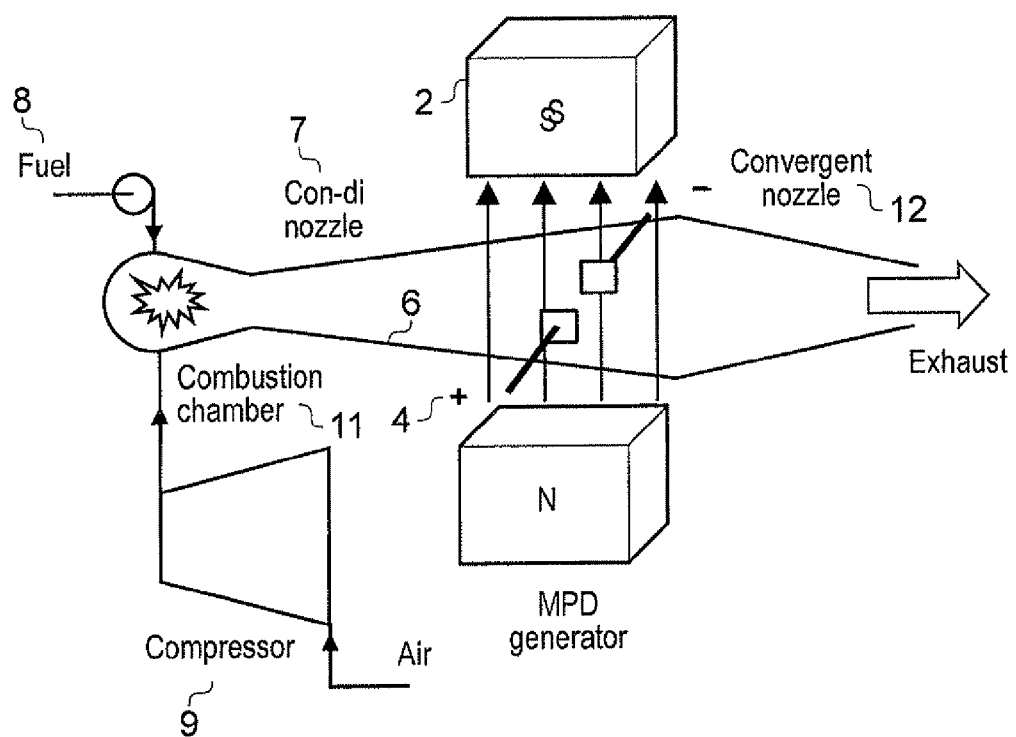
FIG. 3 shows another MPD generator according to an embodiment of the invention.

For other applications, such as using the MPD generator as a "topping cycle" in a power station, the exhaust gas may be travelling too fast to be exhausted satisfactorily into a steam boiler. In that case, a convergent nozzle 12 or other suitable means may be employed to reduce the speed of the exhaust gas, as shown in FIG. 3.

Figure 4:
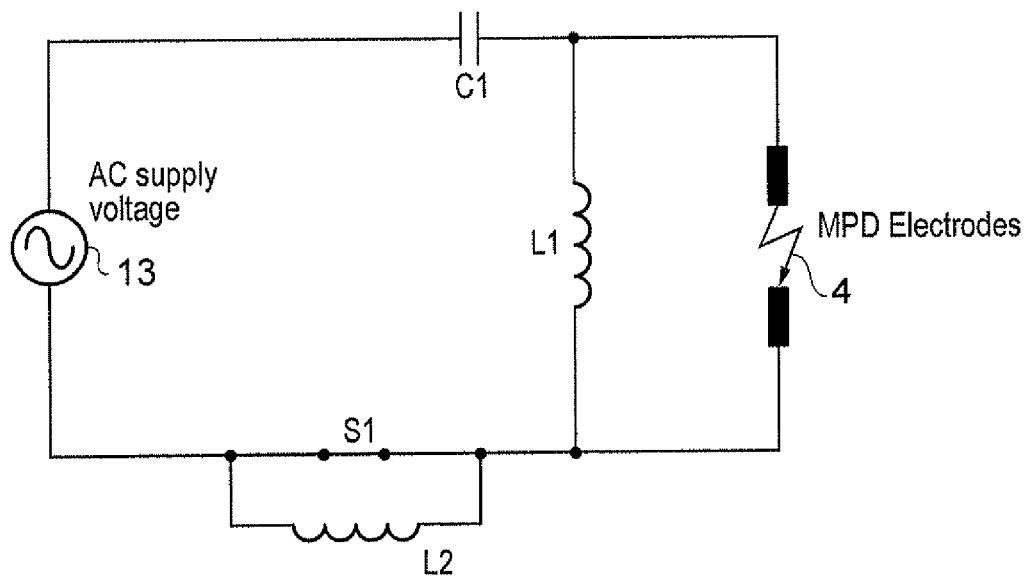
FIG. 4 shows an example fluid break-down circuit and MPD electrodes for use in the MPD generator for breaking down the fluid.

As stated above, the induced MPD voltage would not normally be enough to electrically break down the gas between the electrodes. According to the invention, a fluid break-down circuit is employed to break down the fluid. FIG. 4 shows one example of such a circuit. The circuit includes an AC voltage supply input (source) 13, a capacitor C1, a first inductor L1, a second inductor L2 and a bypass switch S1. The MPD electrodes are provided in parallel to the first inductor L1.

To start MPD generation, a fast flowing stream of gas passes through the MPD duct 6 and through the magnetic field 2 in the MPD duct 6. A DC MPD voltage is produced between the MPD electrodes but this voltage is not sufficient to electrically break down the gas between the electrodes. The field break down circuit of FIG. 4 produces an additional voltage to achieve electrical breakdown of the fluid.

Capacitor C1 and inductor L1 form a resonant circuit which is tuned to be in electrical resonance with the AC supply voltage. It is to be noted that the capacitor C1 and the inductor L1 are arranged in series. The result of this resonance is to develop a voltage across L1 that is many times that of the AC supply voltage and which is enough to electrically break down the gas between the MPD electrodes 4. Once the gas has broken down, the MPD voltage is sufficient to maintain a DC current between the electrodes 4 and through L1. L1 can therefore be described as a "DC short circuit inductor".

During the starting of the MPD generation, inductor L2 is removed from service by shunting it by closing the switch S1. Hence, S1 may be termed an "inductor by-pass switch".

However, after occurrence of electrical breakdown of the gas between the MPD electrodes 4, which short-circuits inductor L1, the electrical resonance is destroyed so that the resulting circuit has an unduly high impedance to AC.

Figure 5:
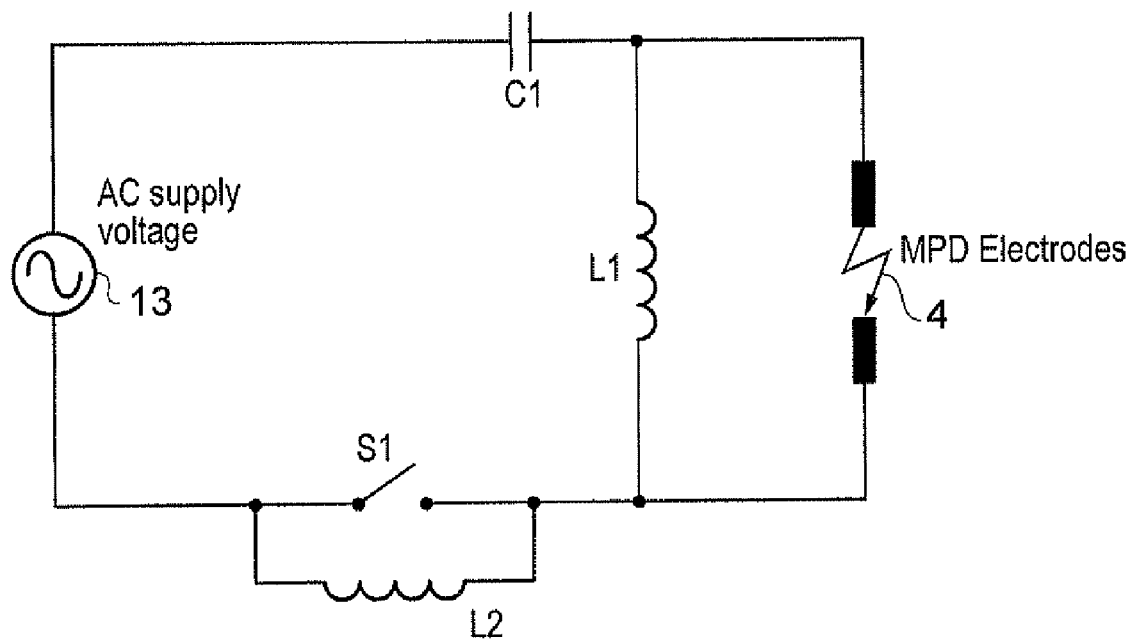
FIG. 5 shows the fluid break-down circuit and MPD electrodes of FIG. 4 in a configuration for generating AC power.

FIG. 5 shows the circuit in a configuration used to restore resonance. The inductor by-pass switch S1 is opened, bringing inductor L2 into service e.g. putting in series with the capacitor C1 and inductor L1. Inductor L2 is designed to resonate with C1, L1 and the gas between the MPD electrodes, thus restoring resonance to the circuit.

Restoration of resonance allows the AC voltage supply source 13 to circulate a large AC current through the gas between the MPD electrodes 4. The gas has a negative dynamic resistance r, i.e. the voltage-current characteristic represented on a graph having voltage V as the ordinate and current I as the abscissa is a curve having a negative slope such that $r=dV/dI$ is negative. The AC current interacts with the negative dynamic resistance of the gas to generate AC power since the negative resistance behaves as a generator. The power is extracted from the electrodes 4, preferably by the fluid break-down circuit functioning as a generating circuit.

An additional advantage of restoring resonance is that resonance greatly improves the purity of the waveform of the AC generated, markedly reducing troublesome harmonics.

In addition, the capacitor C1 serves an additional useful purpose in blocking the flow of MPD DC current into the AC supply 13. This is useful because most AC supplies are intolerant of DC.

As described above, the fluid break-down circuit is used to provide an additional voltage—in addition to the MPD voltage—to electrically break-down the gas between the MPD electrodes 4. This results in improved ionisation of the current path in the MPD duct 6. It can be seen that the MPD electrodes 4 are used as a short circuit, and this causes a large DC current to flow, greatly increasing the ionisation of the gas and its electrical conductivity compared to the prior art. In this regard, electrical conductivity of the gas in the MPD duct 6 is critical to the success of MPD generation.

The DC short circuit prevents power from being extracted by DC means, as is commonly proposed for MPD generation. Instead, AC power is extracted by using the negative dynamic resistance of the current flow in the MPD generator.

Figure 6:
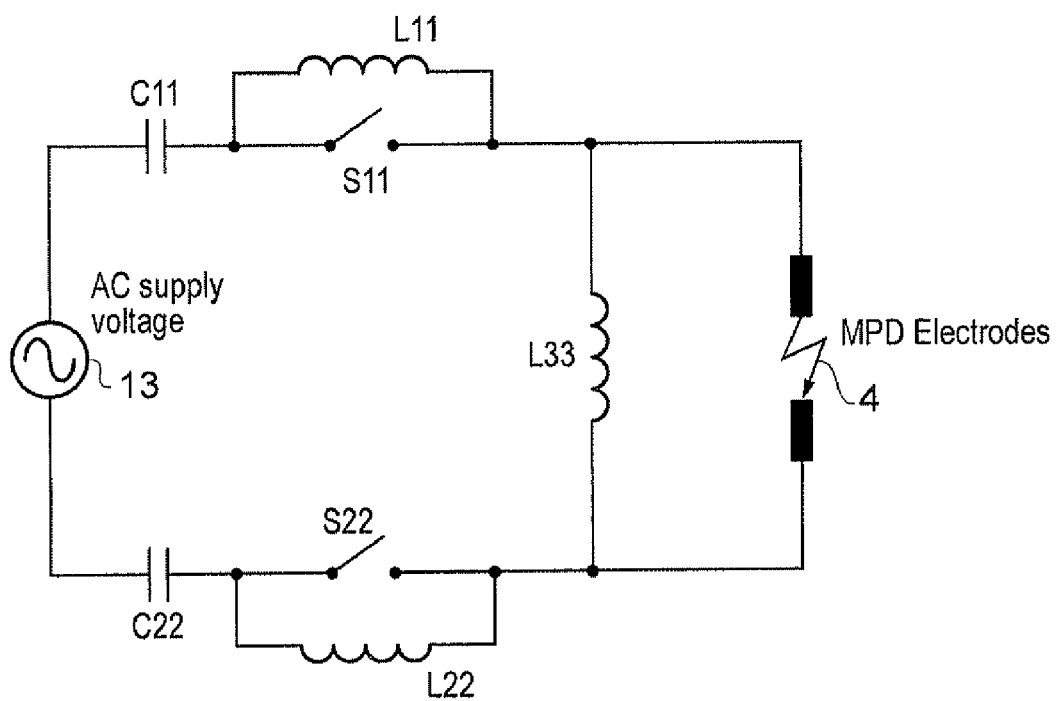
FIG. 6 shows a modification of the fluid break-down circuit to balance it with respect to earth.

FIG. 6 shows a modification of the fluid break-down circuit to balance it to earth. In the balanced circuit, inductor L33 behaves similarly to inductor L1, bypass switches S11 and S22 behave similarly to bypass switch S1, capacitors C11 and C22 behave similarly to C1 and inductors L11 and L22 behave similarly to L2. In other words, the circuit is essentially the same as that of FIGS. 4 and 5, but has an additional inductor, bypass switch and capacitor to balance it with respect to earth. The operation of the circuit is the same as that of FIGS. 4 and 5. It is to be noted that the second capacitor C22 is arranged in series with the inductor L33 and the capacitor C11. The switches S11 and S22 are opened to connect the inductors L11 and L22 in series with the capacitors C11 and C22 and inductor L33.

The series resonant MPD generator may be started using an inductive voltage spike. In order to do so, a starting switch 14 may be added to the circuit in parallel to the MPD electrodes 4, as shown in FIG. 7.

During operation, the starting switch 14 is initially closed which allows a large resonant AC current to flow through C11, L11, L22 and C22. The starting switch 14 is then opened, and the interruption of the current flowing through inductors L11 and L22 produces a large voltage inductive spike across the switch 14 and the MPD electrodes 4. This should normally cause the gas between the electrodes 4 to break down, although there will be some dependence upon the point of wave on the AC waveform when the switch 4 opens.

In order to improve the operation, a control system (not shown) could be used to monitor the point on wave of the AC waveform and to determine the best time to open the switch 4 accordingly. Alternatively, it may be possible to operate the switch in a somewhat random manner until successful breakdown is achieved.

Figure 7:
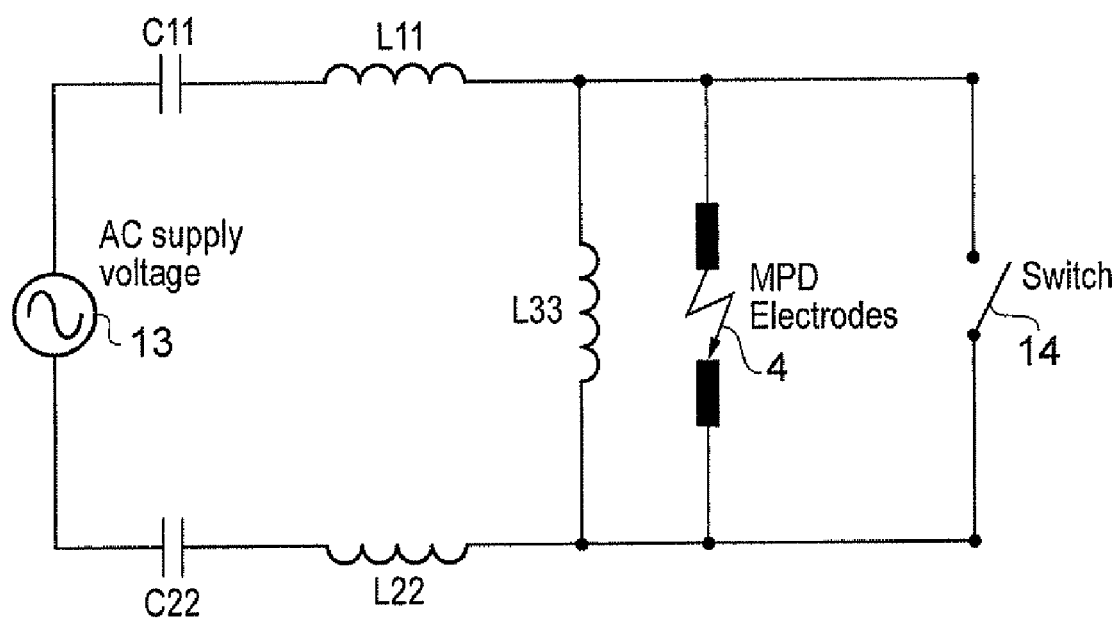
FIG. 7 shows the provision of a switch for starting the MPD generator.

It should be noted that whilst FIG. 7 shows the switch applied to a balanced circuit, it is equally applicable to the unbalanced circuits of FIGS. 4 and 5.

Figure 8:
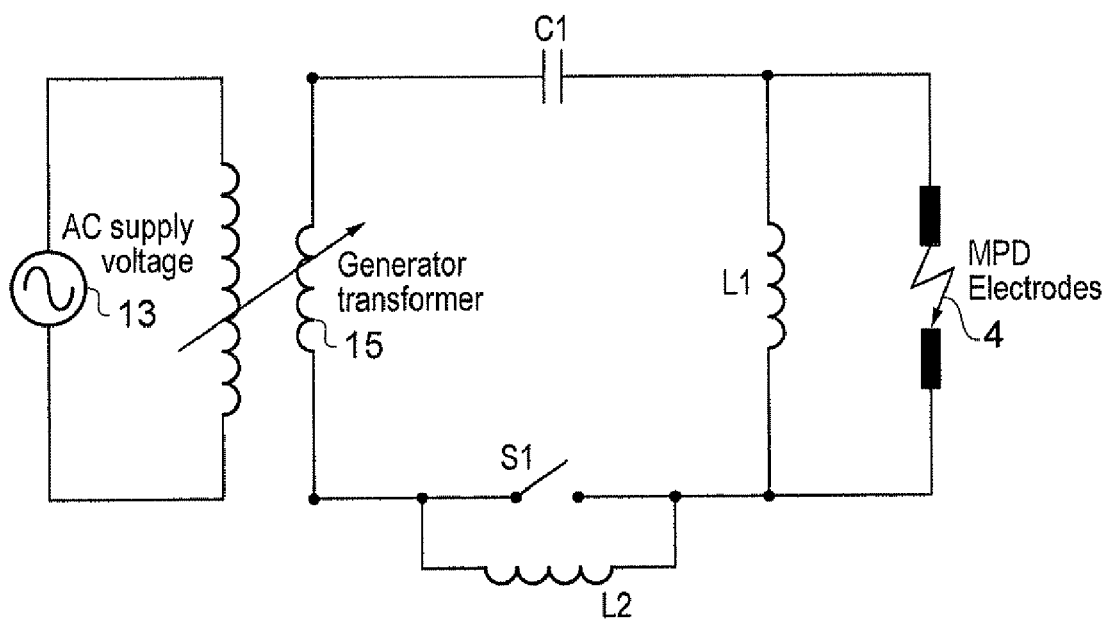
FIG. 8 shows the use of a generator transformer for transforming the AC power supplied to the fluid break-down circuit.

The resonant dynamic AC MPD generator described is fundamentally a high current, low voltage generator which contrasts with electrical transmission systems that operate at high voltage and low current to reduce power losses. Performance can therefore be improved by using a generator transformer to connect the MPD generator to the AC voltage supply source 13 (if the AC voltage supply source is an input from a standard electrical transmission system). FIG. 8 shows a connection of a generator transformer 15 for the unbalanced MPD generator described in 5. A similar connection could be used for the balanced MPD generators described by FIG. 6 and FIG. 7.

In order to improve the control of the MPD generator, the generator transformer 15 should have a ratio that can be varied by known methods of on-load transformer tap-changing or otherwise.

In a further modification of the MPD generator, heterodyne operation may be employed to improve the performance of the AC MPD generator. In other words, two or more AC frequencies may be used.

If two frequencies $f_1$ and $f_2$ are used, the non-linear characteristics of the electric arc will generate additional frequencies including the sum frequency $(f_1+f_2)$ and the difference frequency $(f_1-f_2)$ of the original two frequencies. Thus, for example, if the AC MPD operated efficiently over a band of frequencies including $f_1$ and $f_2$ but power was required at a different frequency, $f_1$ and $f_2$ could be chosen so that the required frequency was the sum $(f_1+f_2)$ or the difference $(f_1-f_2)$ frequency. For example, if power at 50 Hz was required but the AC MPD operated more efficiently at kHz, $f_1$ could be made 2050 Hz and $f_2$ could be made 2000 Hz so that the difference frequency $(f_1-f_2)$ was the required 50 Hz.

Figure 9:
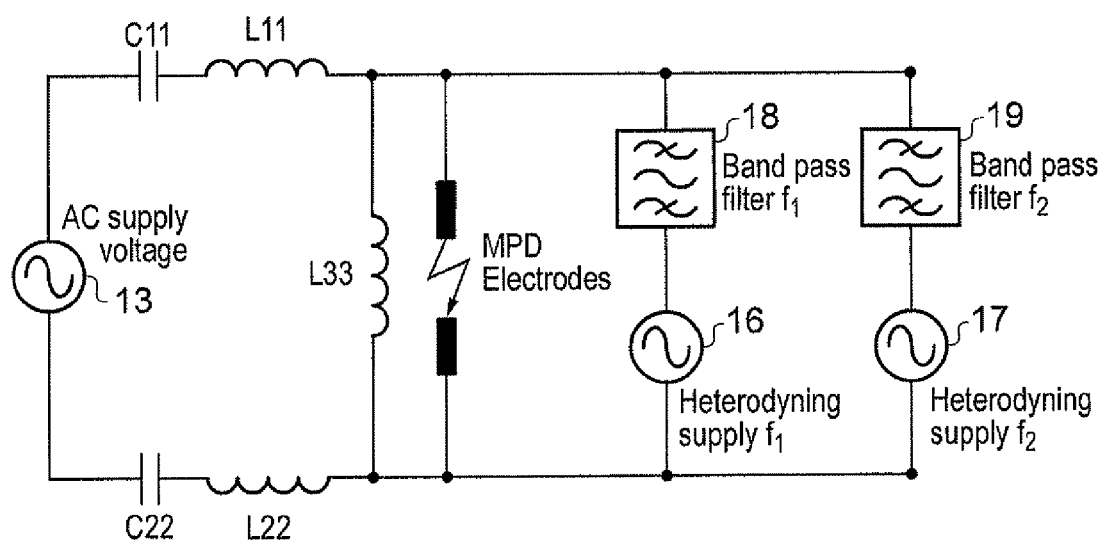
FIG. 9 shows the provision of heterodyning frequency supplies.

FIG. 9 shows a connection arrangement in which heterodyning AC supplies 16, 17 of frequencies $f_1$ and $f_2$ are connected to the MPD electrodes 4 by suitable band pass filters 18, 19. Generator transformers and inductor by-pass switches are omitted for clarity. Further heterodyning AC sources may be connected by similar means.

The MPD generator is started in a similar way to that described in FIG. 4 and FIG. 5. Once AC MPD generation has been established, the heterodyning supplies 16, 17 can be switched on and used for heterodyning operation. Control of the voltages and phases of the heterodyning supplies can be used to deliver power to the MPD generator at the heterodyning frequencies $f_1$ and $f_2$ for various electromagnetic effects in the MPD generator. Alternatively, control of the voltages and phases of the heterodyning supplies can be used to extract power from the MPD generator at frequencies $f_1$ and $f_2$ and deliver it to the heterodyning supplies.

In a further embodiment, the MPD generator can be started without requiring input from an AC voltage supply. This is advantageous as it enables the MPD generator to be used as a "stand alone" generator, for example in a situation in which the MPD generator is the only source of electrical energy supplying an isolated system. A suitable arrangement for starting the MPD generator is shown in FIG. 10.

Figure 10:
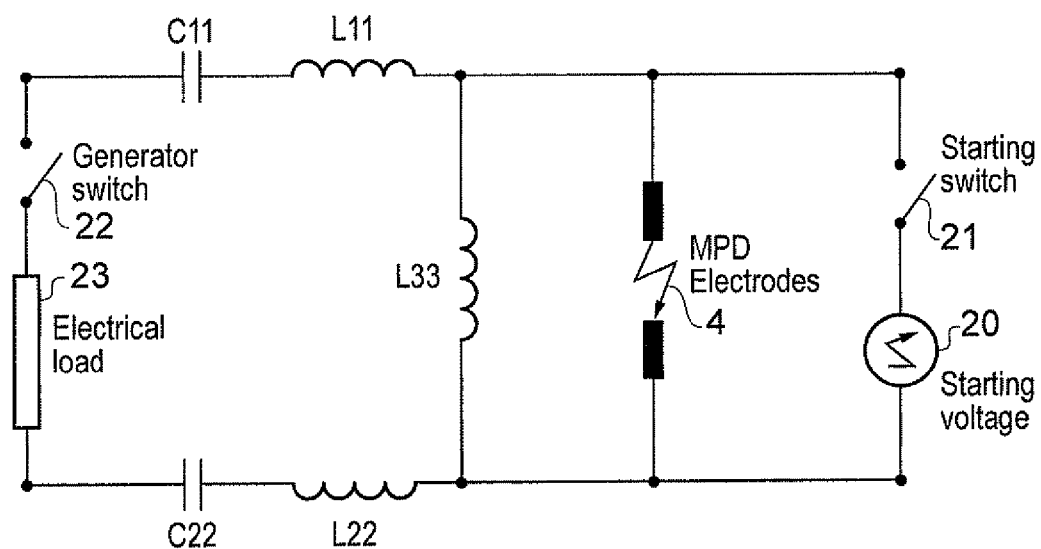
FIG. 10 shows a starting switch and a starting voltage source for starting the fluid break-down circuit.

As can be seen, in the arrangement of FIG. 10 a starting voltage source 20 and a starting switch 21 are provided. These are in parallel to the MPD electrodes 4 and the inductor L33. In addition, a generator switch 22 and an electrical load 23 are shown.

With this arrangement, two possible methods of starting may be used. One method is to use a high voltage starting voltage source as the starting voltage source 20. In operation, the generator switch 22 is initially open. When the fast flowing stream of gas in the MPD duct 6 and the MPD magnetic field 2 has established an MPD voltage in the MPD duct 6, the starting switch 21 is closed to apply a high voltage to the MPD electrodes 4 to break down the gas between the electrodes. When a satisfactory MPD current has been established, the starting switch 21 is opened, disconnecting the starting voltage source 20. Then the load switch is closed to connect the generator to the electrical load 23.

Another method of starting is to use a much lower starting voltage supplied by the starting voltage source 20 to circulate current through inductance L33. Initially, the generator switch 22 is open. When the fast flowing stream of gas in the MPD duct 6 and the MPD magnetic field 2 has established an MPD voltage in the MPD duct 6, the starting switch 21 is closed to circulate current through inductance L33. Once enough current is flowing through inductance L33, the starting switch 21 is opened, interrupting the current through L33 and causing a high voltage to appear across the switch and the MPD electrodes 4. This breaks down the gas between the electrodes 4, causing an MPD current to flow. When a satisfactory MPD current has been established, the generator switch 22 is closed to connect the MPD generator to the electrical load 23.

Figure 11:
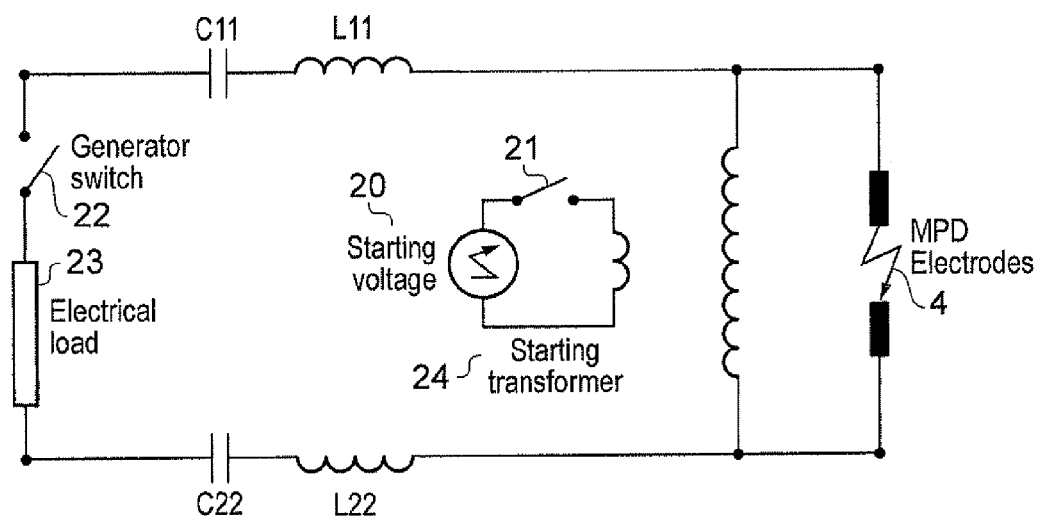
FIG. 11 shows a starting transformer for starting the fluid break-down circuit.

In addition to the above arrangement, a starting transformer may be used for starting the MPD generator. FIG. 11 shows an arrangement in which a starting transformer 24 is provided for starting the MPD generator. The high voltage winding of the starting transformer 24 is connected to the MPD electrodes 4. With this arrangement, two methods of starting are possible.

In one starting method, starting voltage source 20 is connected to the low voltage winding of the starting transformer 24 in order to apply a high voltage to the MPD electrodes 4 and electrically break down the gas between the electrodes 4. Once a satisfactory MPD current has been established, the starting voltage source 20 may be disconnected.

In the other starting method, the starting voltage source 16 is used to circulate current through the low voltage winding of the starting transformer 24. Then, switch 21 is opened to create an inductive voltage spike at the high voltage winding that electrically breaks down the gas between the MPD electrodes 4.

As a further alternative, an auto-transformer could be used instead of the two-winding transformer.

Figure 12:
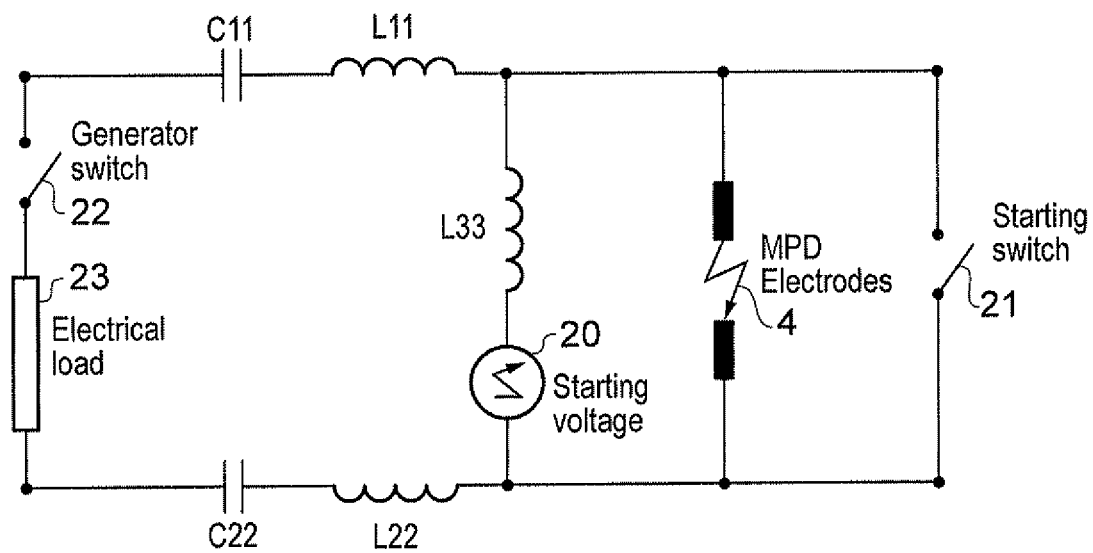
FIG. 12 shows a starting voltage source provided in series with an inductor for starting the fluid break-down circuit.

In a still further arrangement, the starting voltage source 20 may be provided in series with the DC short circuit inductor. FIG. 12 shows such an arrangement.

With this arrangement, the starting switch 21 is initially closed to allow a current to be circulated through the DC short-circuit inductor L33. Subsequent opening of the starting switch 21 interrupts the current through the inductor L33 and produces a high voltage across the switch and the MPD electrodes 4, electrically breaking down the gas between them.

After a satisfactory MPD current has been established, the starting voltage source 20 is removed from service and replaced by a short circuit using a suitable switching arrangement (not shown). In order to supply electrical power to the electrical load 23, the generator switch 22 is closed.

In a still further arrangement, a conversion device (such as an inverter) that converts electrical power from one frequency, voltage, and number of electrical phases to electrical power of another frequency, voltage and number of electrical phases may be used.

The conversion may be between a DC system and the AC power produced by the MPD generator. Any of the above described arrangements may be connected by an inverter to the electrical load or to an electrical AC supply to deliver electrical power into that supply. Further, the inverter may be capable of bi-directional power conversion so that electrical power may be taken from the electrical AC supply in order to start the MPD generator.

Figure 13:
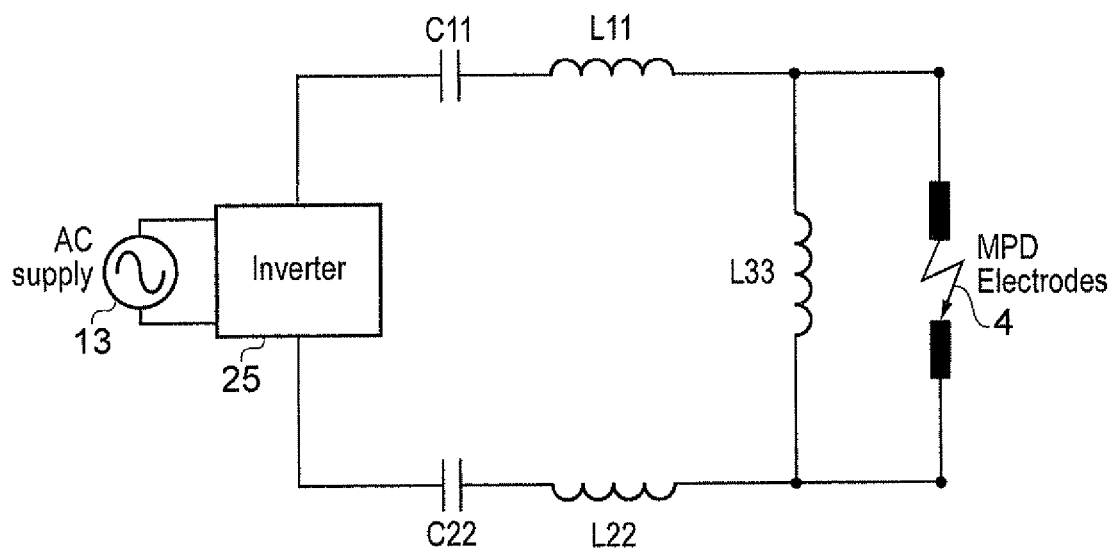
FIG. 13 shows the inclusion of an inverter coupling the AC supply to the MPD generator.

An example arrangement is shown in FIG. 13, in which inverter 25 is used for connection to AC supply 13.

The use of an inverter is advantageous because it enables the MPD generator, which is intrinsically single-phase AC, to supply electrical power to poly-phase AC loads or supplies or DC loads or supplies.

Thus, the operating frequency of the MPD generator is de-coupled from the AC supply or load so that the MPD generator is free to operate at a frequency that best suits MPD generation. This in turn offers the following advantages:

i) Resonance can be independent of the frequency of the AC electrical supply. This is advantageous since public electricity supplies can suffer fluctuations for various reasons;

ii) Tuning to achieve resonance may be done by tuning the output frequency of the inverter;

iii) The frequency of operation can be tuned to reduce "rumble". Rumble is variations in pressure suffered by some combustion processes. Rumble can cause undue noise and damage to plant components;

(iv) The frequency of operation can be tuned to encourage or suppress chemical reactions by exploiting the "gyro frequency" of electrically charged particles involved in various chemical reactions in the plasma. Electrons and other charged particles tend to spiral around magnetic field lines in a plasma at a frequency called the 'gyro frequency'. Operating at one or more "gyro frequencies" helps to improve combustion and reduce emissions, in particular emissions of nitrous oxides and particulates.

As an alternative to an inverter, a motor-generator set may be used for power conversion instead.

In the above embodiments, it is preferable that the inductors (L1 etc) and capacitors (C1 etc) are variable inductors and capacitors. This enables the circuit characteristics to be altered for various electromagnetic effects, in particular to enable tuning for best resonance. In this regard, tuning will normally be necessary in order to allow for variations in the frequency of an AC supply, and also for changes in the electrical characteristic of the gas between the MPD electrodes.

The switches described above may be any device capable of switching an electric current, such as mechanical switches, circuit breakers or electronic devices such as thyristors. In some arrangements, a high current version of a glow starter used to start a fluorescent lamp may be used.

In all of the above embodiments, further measures may be taken to enhance the ionisation of the gas in the MPD duct 6. One such measure would be to irradiate the gas with electromagnetic radiation, such as microwaves, ultraviolet or gamma rays. Alternatively, the gas could be irradiated with corpuscular radiation, such as alpha rays, beta rays or beams of ions.

Another such measure would be to seed the gas with chemicals, such as alkali metals or their compounds, or radioactive substances.

It may also be possible to modulate the means of ionisation to improve the AC generation, especially if the frequency of modulation is synchronised or otherwise related to the frequency of the AC power generated. This may be used to alter the harmonic content of the AC power.

In all of the above embodiments, the magnetic field may be modulated to improve the AC generation. Preferably, the frequency of modulation should be synchronised or otherwise related to the frequency of the AC power generated. This may be used to alter the harmonic content of the AC power.

MPD generators embodying the invention may be supplied with gas to the MPD duct 6 by the combustion of a suitable fuel. The gas resulting from the combustion of the fuel is expanded to a high velocity low pressure gas flow and supplied to the MPD duct 6.

Figure 14:
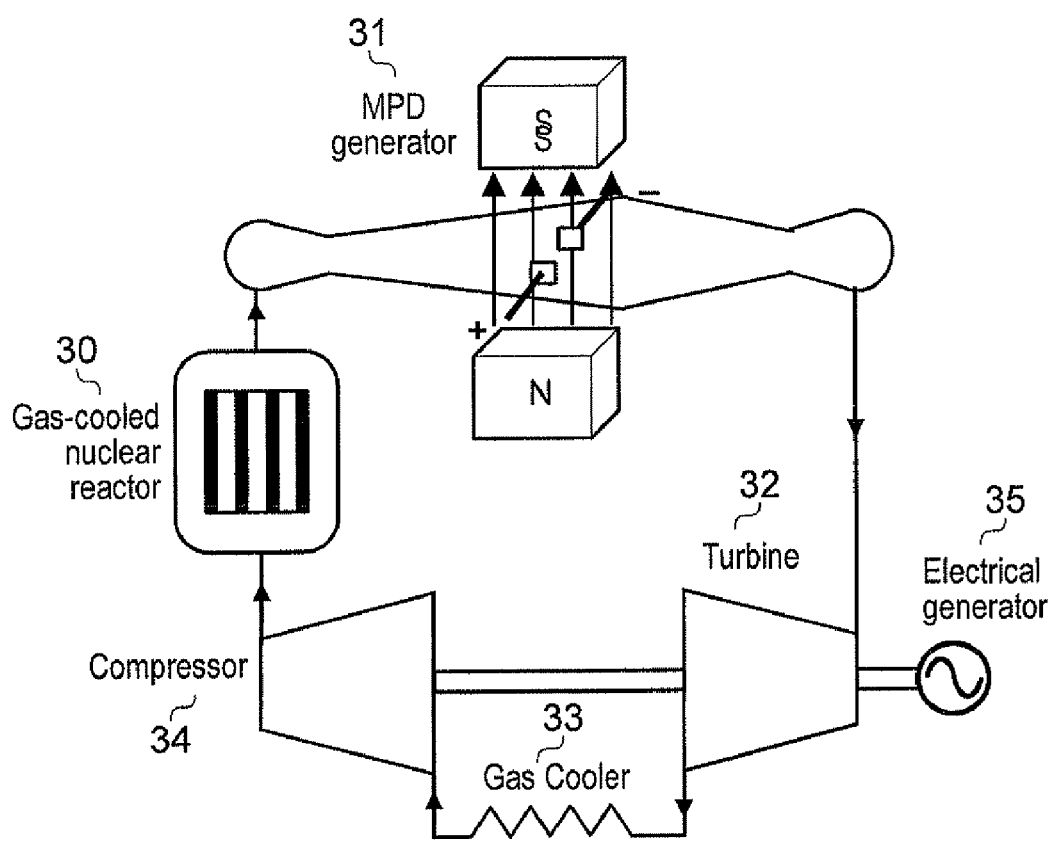
FIG. 14 shows a nuclear electricity generating system incorporating an MPD generator embodying the invention.

However, other sources of hot gas may be used. FIG. 14 shows an electricity generating system including a gas-cooled nuclear reactor 30, an MPD generator 31, a turbine 32, a gas cooler 33, a compressor 34 and an electrical generator 35.

The gas-cooled nuclear reactor 30 operates in a closed Brayton gas power cycle. The nuclear reactor 30 heats gas under pressure and that gas is expanded to form a high velocity low pressure stream suitable for MPD generation. After passing through the MPD generator 31, the resulting exhaust gas from the MPD generator 31 is used to drive the turbine 32 which drives the electrical generator 35. The gas is then cooled in a gas cooler 33 and compressed by the compressor 34 using some of the power developed by the turbine 32. The compressed gas is delivered to the nuclear reactor 30 to start the cycle again. A suitable gas cooled reactor 30 would be a high temperature helium-cooled generation IV reactor, but other gas cooled reactors such as an advanced gas cooled reactor, which uses carbon dioxide, could serve instead. One advantage of helium is that it has one of the lowest breakdown voltage of gases commonly used in nuclear reactors.

Figure 15:
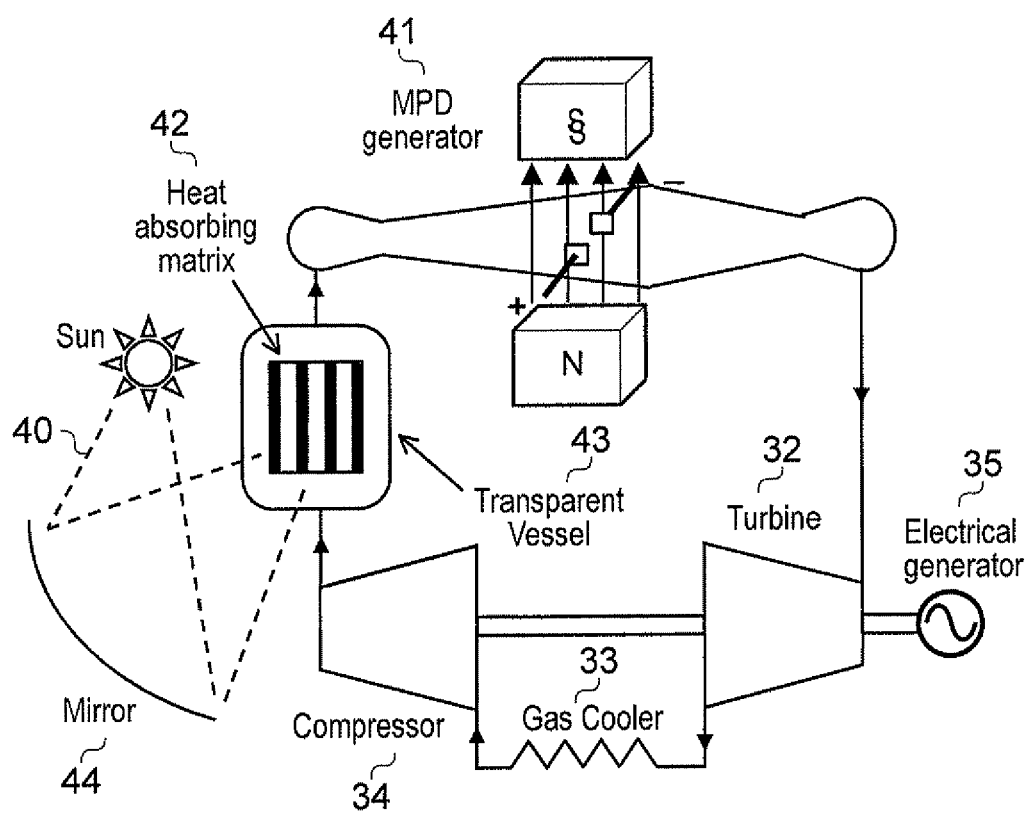
FIG. 15 shows another electricity generating system using solar power and incorporating an MPD generator embodying the invention.

FIG. 15 shows an electricity generating system including a solar powered gas heater 40, an MPD generator 41, the turbine 32, the gas cooler 33, the compressor 34 and the electrical generator 35.

The solar powered gas heater includes a porous heat-absorbing matrix 42 enclosed in a vessel 43 having a transparent region to admit concentrated sunlight to heat the matrix 42. An optical focussing system such as mirror 43 is provided to concentrate sunlight onto the transparent region of the vessel 43. The resultant heated gas is used as an input to the MPD generator 41, after having been expanded to form a high velocity, low pressure stream.

Figure 16:
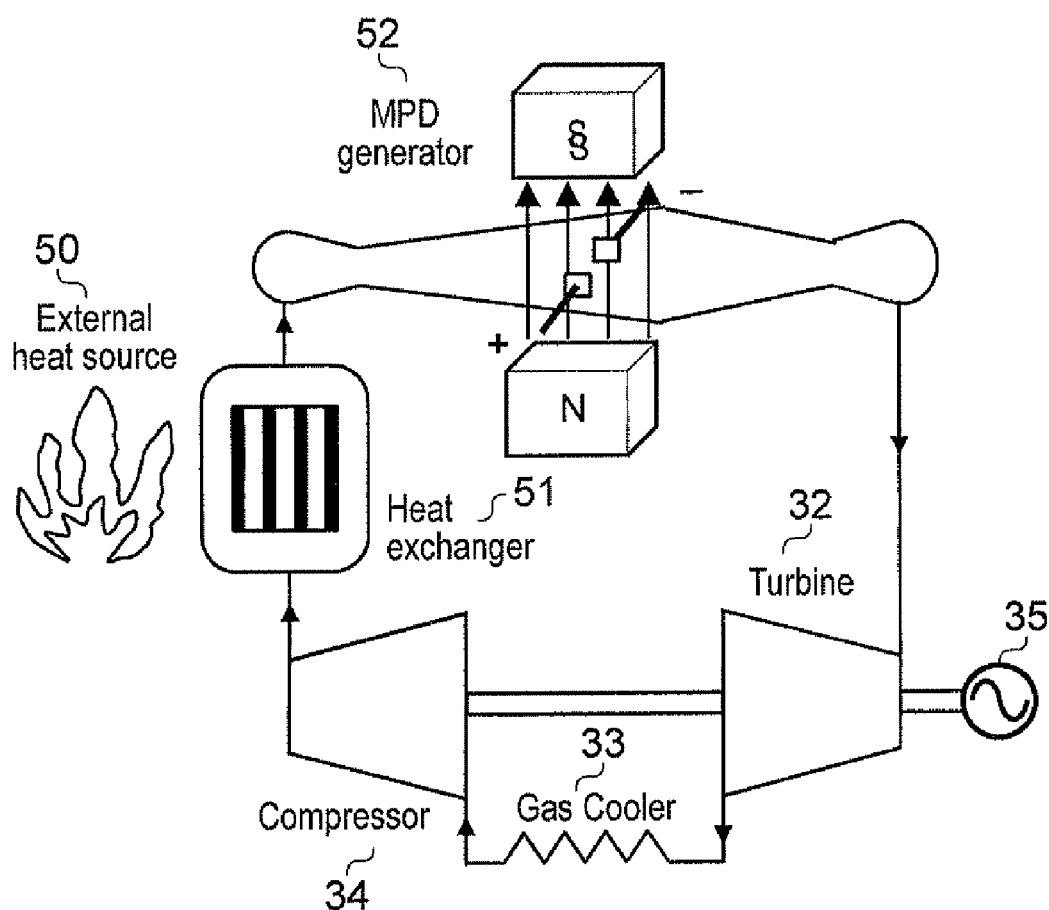
FIG. 16 shows still another electricity generating system incorporating an MPD generator embodying the invention.

FIG. 16 shows an electricity generating system including an external heat source 50, a heat exchanger 51, an MPD generator 52, the turbine 32, the gas cooler 33, the compressor 34 and the electrical generator 35. In this system, the MPD generator and Brayton-cycle gas turbine uses gas heated by the external heat source 50 via the heat exchanger 51 or other means.

Figure 17:
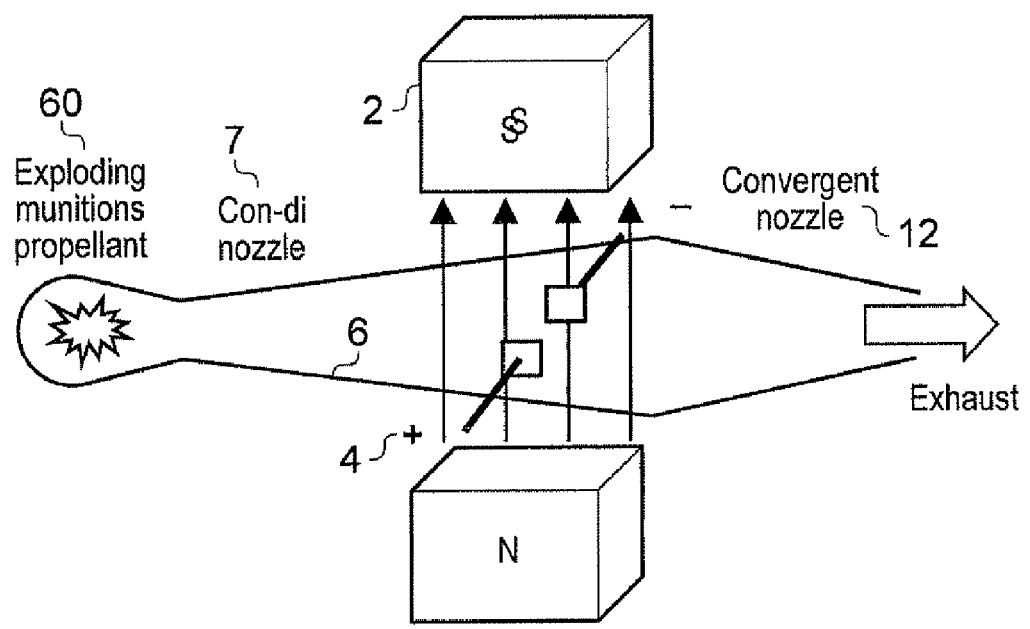
FIG. 17 shows an MPD generator embodying the invention applied to a pulsed-power application.

FIG. 17 shows an MPD generator embodying the invention applied to a pulse-power application, for example using munitions propellant 60 as a fuel. In such an application, the MPD generator would be operated in open-cycle, as shown. Other pulse power applications could include using known pulse detonation engines or pressure gain combustion engines to produce a pulsating flow of high velocity gas. Preferably, the resonant AC MDP generator should be tuned or synchronised to the frequency of the pulses of gas or multiples or fractions of the same, in order to improve the performance of the MDP generator and the engine in question.

Further modifications of the MDP generators embodying the invention may be made so as to eliminate or remove nitrous oxides. In this regard, electric arcs are a source of nitrous oxides and it is likely that combustion in air and the ionisation in the MPD duct will produce nitrous oxides that could be harmful to the environment. In order to deal with this, chemical 'scrubbers' could be installed in the exhaust gas stream to remove nitrous oxides, perhaps even to use them as chemical feedstocks. Alternatively, or in addition, 'oxy-firing' may be used to produce the hot gas. Oxy-firing is combustion using pure oxygen instead of air, which avoids forming nitrous oxides.

A further advantage of the above MPD generators is that they can be applied to a wide variety of fuels, including fuels such as pulverised coal or residual fuel oil that would be quite unsuitable for direct use in other forms of generation such as gas turbines or fuel cells. They could also be used for the improved incineration of hazardous waste, such as chemically or biologically hazardous materials, due to the highly ionised conditions within the gas path.

The invention claimed is:

1. A magnetoplasmadynamic (MPD) generator comprising:
   a conveying duct shaped for conveying a high velocity, conductive fluid;
   a magnetic field generator arranged to generate a magnetic field across the conveying duct, substantially perpendicular to the direction of travel of the fluid, such that the fluid passes through the magnetic field when conveyed by the duct;
   electrodes arranged to conduct a current induced in the fluid as it is conveyed by the conveying duct through the magnetic field; and
   a fluid break-down circuit arranged to electrically break-down the fluid by developing an additional voltage across the electrodes, the fluid break-down circuit includes a first inductor and a voltage source connected to the first inductor for generating the additional voltage across the first inductor; and wherein the electrodes of the MPD generator are provided in parallel to the first inductor and short-circuit the first inductor when the additional voltage causes the electrical breakdown of the fluid between the electrodes, wherein the fluid break-down circuit includes a resonant circuit, the resonant circuit comprises a capacitor, wherein the capacitor and the first inductor are the resonant circuit and wherein the resonant circuit is configured to be in electrical resonance with the voltage supplied by the voltage source and wherein the capacitor and the first inductor are arranged in series.

2. An MPD generator as claimed in claim 1, wherein the fluid break-down circuit comprises an AC voltage supply input as the voltage source.

3. An MPD generator as claimed in claim 2, wherein a generator transformer is coupled to the AC voltage supply input to perform current-voltage transformation.

4. An MPD generator as claimed in claim 1, wherein the fluid break-down circuit further comprises:
   a second inductor; and
   a second inductor bypass switch having a first configuration in which the second inductor is bypassed and a second configuration in which the second inductor is not bypassed, wherein the second inductor bypass switch is configured to assume the first configuration until electrical breakdown of the fluid and the second configuration after electrical breakdown of the fluid, whereby the second inductor is then able to resonate with the capacitor, the first inductor and the fluid between the electrodes.

5. An MPD generator as claimed in claim 4, wherein the fluid break-down circuit includes a second capacitor, a third inductor and a third inductor bypass switch, the second capacitor is arranged in series with the first inductor and the capacitor such that it is balanced with respect to earth.

6. An MPD generator as claimed in claim 4, further comprising a switch provided in parallel to the first inductor and the electrodes, the switch being switchable between a closed configuration and an open configuration so as to cause a voltage inductive spike across the electrodes to thereby electrically break-down the fluid.

7. An MPD generator as claimed in claim 1, further comprising a plurality of heterodyning AC frequency supplies.

8. An MPD generator as claimed in claim 1, wherein the voltage source is a starting voltage source and wherein the fluid break-down circuit further comprises a starting switch arranged to connect and disconnect the starting voltage source to and from the electrodes or to bypass or not bypass the electrodes.

9. An MPD generator as claimed in claim 8, wherein the fluid break-down circuit further comprises a starting transformer for connecting the starting voltage source to the electrodes.

10. An MPD generator as claimed in claim 8, wherein the starting voltage source is provided in series with the first inductor.

11. An MPD generator as claimed in claim 1, further comprising a conversion device for converting the electrical power output by the electrodes into a different frequency, voltage or number of electrical phases for delivering the electrical power to an electrical load or an electrical AC supply.

12. A MPD generator as claimed in claim 1, wherein the source of the fluid of the MPD generator is a gas cooled nuclear reactor, a solar-power device, an external heat device arranged to heat up gas through a heat exchanger, a pulse power source or a combustion chamber arranged to burn fuel.

13. A MPD generator as claimed in claim 1, wherein the conveying duct comprises a convergent-divergent nozzle.

14. A method of operating a magneto-plasma-dynamic generator as claimed in claim 1, the method comprising:
   using the fluid break-down circuit to develop an additional voltage across the electrodes of the MPD generator which is sufficient to electrically break-down the fluid between the electrodes by using the electrodes as a short circuit.

15. A method as claimed in claim 14, further comprising:
   circulating a large AC current through the fluid between the electrodes, after the fluid has been electrically broken down, to generate AC power using the interaction of the AC current with the negative dynamic resistance of the fluid.

* * * * *